US010448759B1

United States Patent
Chapuis et al.

(10) Patent No.: US 10,448,759 B1
(45) Date of Patent: Oct. 22, 2019

(54) ADJUSTABLE SIZE APPARATUSES THAT SECURE PORTABLE ELECTRONIC DEVICES TO DISPLAY TABLES

(71) Applicant: OnQ Solutions, Inc., Hayward, CA (US)

(72) Inventors: Paul Chapuis, Woodside, CA (US); Steven D. Penny, Oakland, CA (US)

(73) Assignee: ONQ Solutions, Inc., Hayward, CA (US)

( * ) Notice: Subject to any disclaimer, the term of this patent is extended or adjusted under 35 U.S.C. 154(b) by 0 days.

(21) Appl. No.: 16/006,092

(22) Filed: Jun. 12, 2018

(51) Int. Cl.
*A47F 7/00* (2006.01)
*A47F 5/16* (2006.01)
*F16B 2/12* (2006.01)
*F16B 2/10* (2006.01)

(52) U.S. Cl.
CPC ............... *A47F 7/00* (2013.01); *A47F 5/16* (2013.01); *F16B 2/10* (2013.01); *F16B 2/12* (2013.01)

(58) Field of Classification Search
USPC ...................................................... 248/274.1
See application file for complete search history.

(56) References Cited

U.S. PATENT DOCUMENTS

| | | | | |
|---|---|---|---|---|
| 6,700,488 B1 * | 3/2004 | Leyden | .............. | G08B 13/1463 340/568.1 |
| 7,187,283 B2 * | 3/2007 | Leyden | .............. | G08B 13/1463 340/568.1 |
| 8,191,851 B2 * | 6/2012 | Crown | ................ | B60R 11/0241 248/316.4 |
| 8,360,373 B2 * | 1/2013 | Johnson | .................. | A47F 7/024 211/26 |
| 8,701,452 B2 * | 4/2014 | Foster | ................ | E05B 73/0082 248/316.1 |
| 8,814,128 B2 * | 8/2014 | Trinh | ...................... | A47F 7/024 248/187.1 |
| 8,864,089 B2 * | 10/2014 | Hung | ................... | F16M 11/041 248/122.1 |

(Continued)

OTHER PUBLICATIONS

RTF, "Smartphones—Samsung Note 3, LG Flex, HTC One, Apple iPhone 5, Blackberry Z10", http://www.rtfglobal.com/solutions/by-devices-type/smartphones/#!prettyPhoto, downloaded on Jun. 11, 2018.

(Continued)

*Primary Examiner* — Monica E Millner
(74) *Attorney, Agent, or Firm* — Vierra Magen Marcus LLP

(57) ABSTRACT

Adjustable size security apparatuses are disclosed herein. In certain embodiments, such an adjustable size security apparatus includes a plurality of brace elements, a main body, and a neck. Each of the brace elements is configured to be secured to a separate portion of any one of a plurality of different sized rectangular shaped portable electronic devices. The main body is configured to selectively lock the brace elements in place so that the brace elements cannot be removed from the rectangular shaped portable electronic device to which the brace elements are secured. The neck is configured to secure the main body to a display table and thereby secure, to the display table, the rectangular shaped portable electronic device to which the brace elements are secured.

20 Claims, 13 Drawing Sheets

(56) References Cited

U.S. PATENT DOCUMENTS

| | | | |
|---|---|---|---|
| 8,925,886 B2* | 1/2015 | Sears | F16M 11/041 248/220.21 |
| 8,985,544 B1 | 3/2015 | Gulick, Jr. | |
| 8,998,048 B1* | 4/2015 | Wu | B62J 11/00 224/420 |
| 9,022,337 B2* | 5/2015 | Petruskavich | F16M 11/041 248/176.1 |
| 9,039,785 B2 | 5/2015 | Gulick, Jr. | |
| 9,097,380 B2* | 8/2015 | Wheeler | A47F 7/024 |
| 9,159,309 B2* | 10/2015 | Liu | H04M 1/04 |
| 9,161,466 B2* | 10/2015 | Huang | H05K 5/0204 |
| 9,568,141 B1* | 2/2017 | Zaloom | F16M 11/12 |
| 9,714,528 B2* | 7/2017 | Van Balen | A47F 7/0246 |
| 9,936,823 B2* | 4/2018 | Galant | F16M 11/041 |
| 10,165,873 B2* | 1/2019 | Gulick, Jr. | A47F 7/0246 |
| 2010/0108828 A1* | 5/2010 | Yu | F16M 11/041 248/123.11 |
| 2010/0148030 A1* | 6/2010 | Lin | B60R 11/0252 248/371 |
| 2012/0037783 A1* | 2/2012 | Alexander | A47F 7/024 248/551 |
| 2012/0234055 A1* | 9/2012 | Bland, III | E05B 73/0082 70/15 |
| 2013/0301216 A1* | 11/2013 | Trinh | A47F 7/0246 361/679.58 |
| 2013/0318639 A1 | 11/2013 | Gulick, Jr. | |
| 2014/0060218 A1* | 3/2014 | Bisesti | F16M 11/04 73/865.8 |
| 2015/0089675 A1 | 3/2015 | Gulick, Jr. | |
| 2015/0108948 A1 | 4/2015 | Gulick, Jr. et al. | |
| 2015/0196140 A1* | 7/2015 | Lin | F16M 13/02 248/551 |
| 2015/0300050 A1 | 10/2015 | Van Balen | |
| 2017/0049251 A1 | 2/2017 | Gulick, Jr. et al. | |
| 2017/0188724 A1* | 7/2017 | Lin | E05B 73/0082 |
| 2018/0058107 A1 | 3/2018 | Lucas et al. | |

OTHER PUBLICATIONS

Gripzo, "Universal Smartphone Grip/ Universal Tablet Grip", https://www.gripzo.com/en/products/smartphones/iphone, downloaded on Jun. 14, 2018.

Gripzo, "iPad Enclosure", https://www.gripzo.com/en/products/tablets/ipad-enclosure, downloaded on Jun. 11, 2018.

Gripzo, "iPhone", https://www.gripzo.com/en/products/smartphones/iphone, downloaded on Jun. 11, 2018.

Scorpion Security Products, "4-Point ERS Phone Scorpion", https://www.scorpionsecurityproducts.com/product/4-point-ers-phone-scorpion/, downloaded on Jun. 11, 2018.

Scorpion Security Products, "4-Point ERS Small Tablet Scorpion", https://www.scorpionsecurityproducts.com/product/4-point-ers-small-tablet-scorpion/, downloaded on Jun. 11, 2018.

Dongguan Comer Electronic Technology Co., Ltd., "Comer Anti-Theft Locking Laptop Mechanical Security Display Frame for Mobile Phone Stores", http://www.comerdisplay.com/sale-8024631-comer-anti-theft-locking-laptop-mechanical-security-display-frame-for-mobile-phone-stores.html, downloaded on Jun. 11, 2018.

Dongguan Comer Electronic Technology Co., Ltd., "Comer Universal Display Mechanical Anti-Theft Security Display Locking System for Tablet Brackets", http://www.smartcomer.com/sale-8028445-comer-universal-display-mechanical-anti-theft-security-display-locking-system-for-tablet-brackets.html, downloaded on Jun. 11, 2018.

RTF, "Vise—Securely and Attractively Placing Your Product First", http://www.rtfglobal.com/products/vise-cell-phone-security/, downloaded on Jun. 11, 2018.

* cited by examiner

ADJUSTABLE SIZE APPARATUSES THAT SECURE PORTABLE ELECTRONIC DEVICES TO DISPLAY TABLES

FIELD OF TECHNOLOGY

Embodiments of the present technology relate to apparatuses that secure portable electronic devices to display tables.

BACKGROUND

Portable electronic devices, such as mobile phones, tablet computers, e-book readers, and the like, are often sold in retail stores. To enable customers to view, touch, and interface with such portable electronic devices in a retail store, the portable electronic devices are often displayed on a display table. The portable electronic devices, which are often costly, are typically secured to the display table to prevent theft. For example, a portable electronic device can be physically secured to a table using what is often referred to as a security bracket. However, such security brackets are typically customized for a specific size of a specific portable electronic device. Accordingly, if a retail store sells multiple different companies' models of a same type of portable electronic device (e.g., a mobile phone), and/or sells multiple different models made by a same company (in multiple different sizes), then the retail store will need to buy and use many different sized security brackets. Additionally, whenever a new model of a portable electronic device is released, the size of the device if often changed compared to the previous model. Accordingly, a security bracket that was able to secure an earlier version of a portable electronic device will often be incompatible with the next version of that device. This leads to a retail store needing to order new security brackets each time a new model of a specific portable electronic device is released. Where a retail store sells multiple different models, each year that store may need to buy numerous new security brackets, which can be very costly and can thus significantly increase the overhead of the retail store.

SUMMARY

Adjustable size security apparatuses are disclosed herein. In certain embodiments, such an adjustable size security apparatus includes a plurality of brace elements, a main body, and a neck. Each of the brace elements is configured to be secured to a separate portion of any one of a plurality of different sized rectangular shaped portable electronic devices. The main body is configured to selectively lock the brace elements in place so that the brace elements cannot be removed a rectangular shaped portable electronic device to which the brace elements have been secured. The neck is configured to secure the main body to a display table and thereby secure, to the display table, the any one of a plurality of different sized rectangular shaped portable electronic devices to which the brace elements are secured.

In accordance with certain embodiments, the main body includes a front portion having a first side and a second side opposite the first side, a first back portion attached to the first side of the front portion by a first hinge, and a second back portion attached to the second side of the front portion by a second hinge. The main body has a closed state and an opened state that are transitional between by pivoting the first and second back portions of the main body relative to the front portion using the first and second hinges. The main body provides an open cavity while the main body is in its open state, and the main body provides a closed cavity between the front portion and the first and second back portions thereof while the main body is in its closed state.

In accordance with certain embodiments, the plurality of brace elements comprise four brace elements each including a respective corner element and a respective locking element coupled to the corner element. Each of the corner elements is configured to be placed over a respective one of four corners of a rectangular shaped portable electronic device, each of the locking elements configured to be maneuverable within the open cavity of the main body while the main body is in its open state. Each of the locking elements is configured to be locked in place within the closed cavity of the main body while the main body is in its closed state.

In accordance with certain embodiments, the neck includes a first neck portion that extends from the first back portion of the main body, and a second neck portion that extends from the second back portion of the main body. The first and second neck portions are adjacent to one another while the main body is in its closed state. By contrast, the first and second neck portions are separated from one another while the main body is in its open state.

In accordance with certain embodiments, the apparatus further comprises a collar that is configured to be slid over and encase peripheries of the first and second neck portions while the main body is in its closed state. The first and second neck portions are configured to be secured to one another, using one or more fasteners, while the main body is in the closed state. In such embodiments, the one or more fasteners, which are used to secure the first and second neck portions to one another, are covered by the collar after the collar has been slid over and encases the peripheries of the first and second neck portions while the main body is in its closed state, and thus, the one or more fasteners are inaccessible while the collar is encasing the peripheries of the first and second neck portions.

In accordance with certain embodiments, a backside of the front portion of the main body includes a plurality of first features; a frontside of each of the first and second back portions includes a plurality of second features. Further, the locking element, of each of the four brace elements, includes a frontside having a plurality of third features configured to engage with at least some of the first features that are on the backside of the front portion of the main body. Additionally, the locking element, of each of the four brace elements, includes a backside having a plurality of fourth features configured to engage with at least some of the second features that are on the frontside of one of the first and second back portions of the main body. In such embodiments, while the main body is in its open state: the locking element, of each of the four brace elements, is maneuverable in a first direction by moving the third features on the frontside of the locking element relative to the first features on the backside of the front portion of the main body; and the locking element, of each of the four brace elements, is maneuverable in a second direction, that is orthogonal to the first direction, by moving the fourth features on the backside of the locking element relative to the second features on the frontside of one of the first and second back portions of the main body.

In accordance with certain embodiments, each locking element, of the four brace elements, is configured to be locked in place while the main body is in its closed state by: engagement between one or more of the first features on the backside of the front portion of the main body and one or more third features on the frontside of the locking element;

and engagement between one or more of the second features on the frontside of one of the first and second back portions of the main body and one or more fourth features on the backside of the locking element.

In accordance with certain embodiments, the first features, that are on the backside of the front portion of the main body, comprises a plurality of parallel grooves extending in a first direction; the second features, that are on the frontside of each of the first and second back portions of the main body, comprise a plurality of parallel grooves extending in a second direction that is orthogonal to the first direction; the third features, that are on the frontside of the locking element of each of the four brace elements, comprise a plurality of parallel protuberances extending in the first direction and configured to fit within at least some of the parallel grooves extending in the first direction that are on the backside of the front portion of the main body; and the fourth features, that are on the backside of the locking element of each of the four brace elements, comprises a plurality of parallel protuberances extending in the second direction and configured to fit within at least some of the parallel grooves extending in the second direction that are on the frontside of one of the first and second back portions of the main body.

In accordance with certain embodiments, while the main body is in its open state: the locking element, of each of the four brace elements, is maneuverable in the first direction by moving the protuberances extending in the first direction relative to the parallel grooves extending in the first direction that are on the backside of the front portion of the main body; and the locking element, of each of the four brace elements, is maneuverable in the second direction by moving the protuberances extending in the second direction relative to the parallel grooves extending in the second direction that are on the frontside of one of the first and second back portions of the main body.

In accordance with certain embodiments, each locking element, of the four brace elements, is configured to be locked in place while the main body is in its closed state by: engagement between one or more of the parallel grooves extending in the first direction on the backside of the front portion of the main body and one or more protuberances on the frontside of locking element; and engagement between one or more of the parallel grooves extending in the second direction on the frontside of one of the first and second back portions of the main body and one or more protuberances extending in the second direction on the backside of the locking element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

Embodiments of the present technology relate to adjustable size security apparatuses that can be used to selectively secure any one of a plurality of different sized rectangular shaped portable electronic devices to a display table. Examples of such rectangular shaped portable electronic devices, each of which can also be referred to more succinctly as a portable electronic device, include, but are not limited to, mobile phones, tablet computers, e-book readers, and personal data assistants (PDAs).

The adjustable size security apparatus, which can also be referred to herein more succinctly as a security apparatus or a security bracket, can be used to secure a portable electronic device to a display table in a manner that enables a customer or other person to view, touch, and interface with the portable electronic devices. In contrast to prior security brackets that were customized for a specific size of a specific portable electronic device, the security apparatus of an embodiment of the present technology can be adjusted to hold and secure any one of a plurality of different sized rectangular shaped portable electronic devices to a display table. Accordingly, by using an embodiment of the present technology, a retail store need not order new security brackets each time a new model of a specific portable electronic device is released. Further, where a retail store sells multiple different models of a same type of portable electronic device (e.g., a mobile phone), the retail store need not order multiple different size security brackets. Rather, the retail store may simply order multiple instances of an adjustable size security bracket, according to an embodiment of the present technology, and can adjust the different instances to appropriate sizes of the multiple different models.

Figure 1:
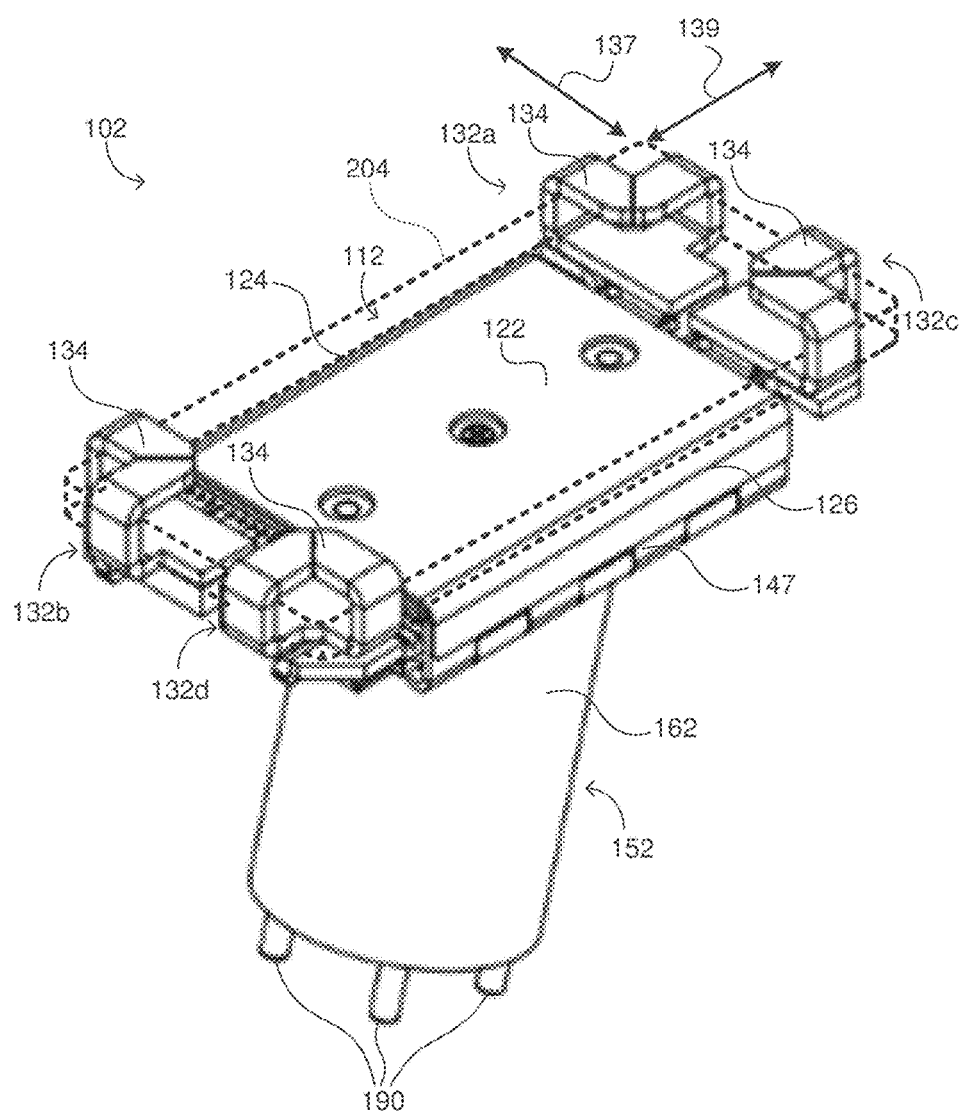
FIG. 1 is a front perspective view of an adjustable size security apparatus according to an embodiment of the present technology.

FIG. 1 is a front perspective view of an adjustable size security apparatus 102 according to an embodiment of the present technology. The adjustable size security apparatus 102 can alternatively be referred to as an adjustable size security bracket, or more succinctly as a security apparatus or a security bracket.

As shown in FIG. 1, as well as other FIGS., the security apparatus 102 includes a main body 112, four brace elements 132a, 132b, 132c, and 132d, and a neck 152. The main body 112 includes a front portion 122 having two opposing sides 124 and 126, which can also be referred to as a first side 124 and a second side 126, or a left side 124 and a right side 126. The four brace elements 132a, 132b, 132c, and 132d, which can be referred to collectively as the brace elements 132, or individually as a brace element 132, are used to secure a portable electronic device (e.g., a mobile phone 204 represented in dotted line) to the main body 112, and the neck 152 is used to hold the main body 112 (and any portable electronic device secured thereto) at a distance above (and preferably at an acute angle, e.g., 15 degrees, relative to) a display table.

Figure 4:
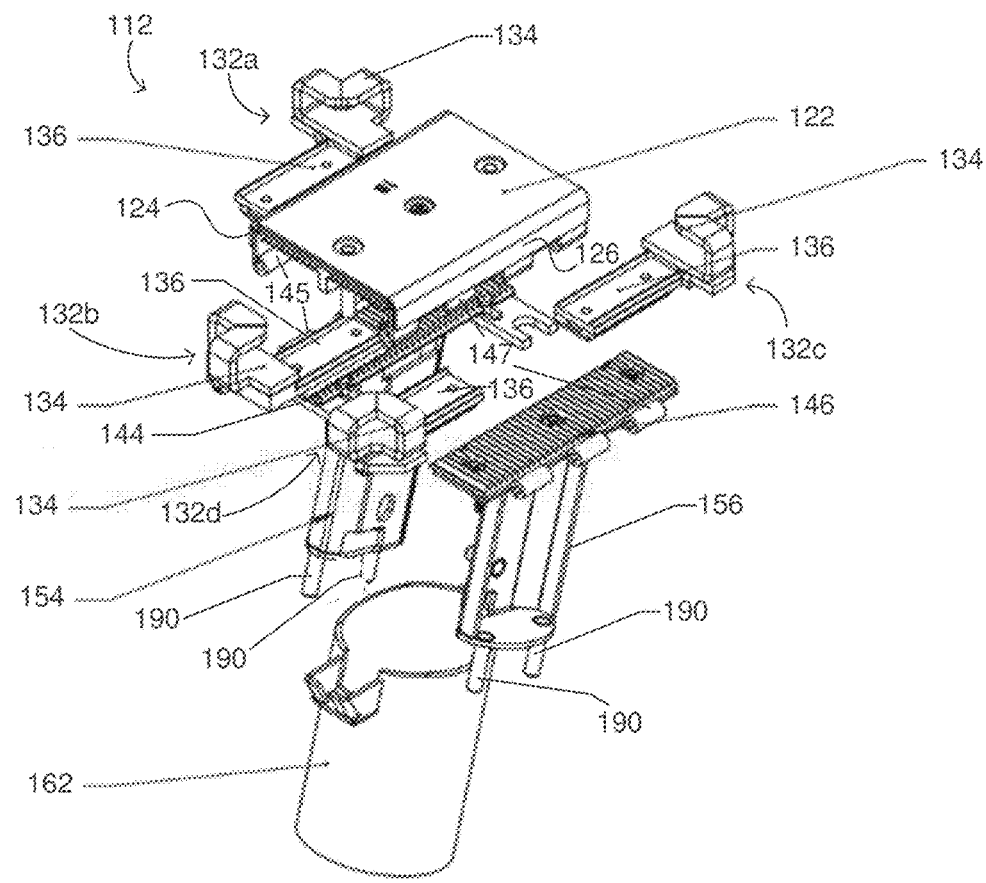
FIG. 4 is an exploded front perspective view of the adjustable size security apparatus introduced in FIG. 1.

Referring to the exploded view in FIG. 4, the main body 112, in addition to including the front portion 122 having the first side 124 and the second side 126 opposite the first side 124, also includes a first back portion 144 and a second back portion 146. The first back portion 144 is attached to the first side 124 of the front portion 122 by a first hinge 145, and the second back portion 146 is attached to the second side 126 of the front portion 122 by a second hinge 147.

Each of the elements of the security apparatus 102, including, but not limited to, the main body 112, the brace elements 132, the first and second neck portions 154, 156, and a collar 162, are preferably made of a strong metal or metal alloy so that the security apparatus 102 is sturdy and cannot be readily bent, cut through, or otherwise broken or tempered with. For example, such elements can be made of steel. Different elements of the security apparatus 102 can be made of the same metal or different metals than other elements. All are subsets of such elements can be painted, powder coated, or otherwise covered to have any desired color and appearance.

The main body 112 has both a closed state and an opened state that are transitional between by pivoting the first and second back portions 144 and 146 of the main body 112 relative to the front portion 122 of the main body 112 using the first hinge 145 and the second hinge 147. In most of the FIGS., such as FIG. 1, the main body 112 is shown as being in its closed state. The main body 112 is shown as being in its open state, e.g., in FIGS. 7 and 8. The main body 112 provides an open cavity 113 while the main body 112 is in its open state. The main body 112 provides a closed cavity between the front portion 122 and the first and second back portions 144, 146 thereof while the main body 112 is in its closed state.

Each brace element 132, which can also be referred to more succinctly as a brace 132, includes a respective corner element 134 and a respective locking element 136 (e.g., shown in FIGS. 2 and 9A-9C) coupled to the corner element 134. Each of the corner elements 134 is configured to be placed over a respective one of four corners of a rectangular shaped portable electronic device, such as the mobile phone 204 represented in dotted line in FIG. 1. Such rectangular shaped portable electronic devices can have sharp corners, but more likely, will have rounded corners, but nevertheless are considered rectangular shaped.

Figure 7:
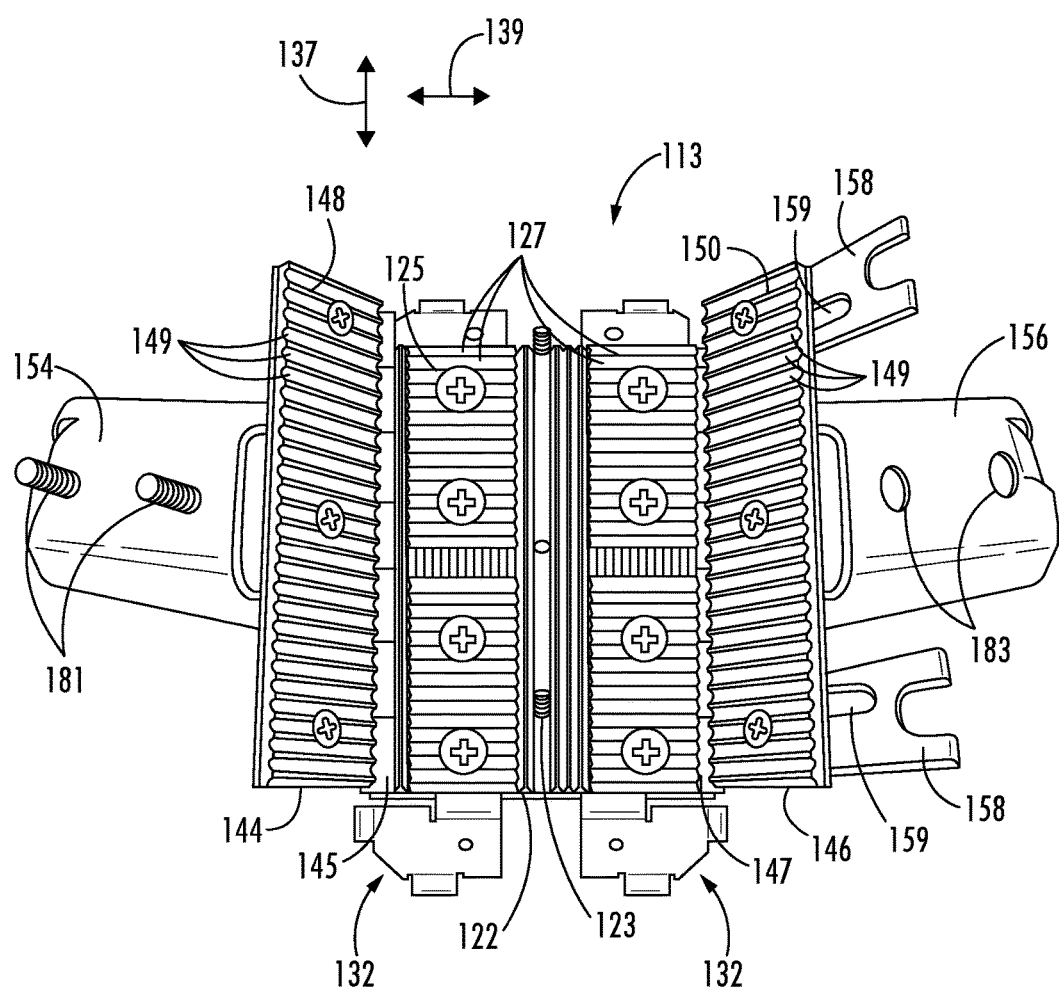
FIG. 7 is a rear perspective view of the adjustable size security apparatus introduced in FIG. 1 while its main body is in its open state.

In the embodiment shown, each of the corner elements 134 wraps around portions of two adjacent sides of a rectangular shaped portable electronic device at or nears its corner. For example, the corner element 134 of the brace element 132a wraps around portions of the left and top sides of a rectangular shaped portable electronic device near its upper left corner. For another example, the corner element 134 of the brace element 132d wraps around portions of the right and bottom sides of a rectangular shaped portable electronic device near its lower right corner. Each of the locking elements 136 is configured to be maneuverable within the open cavity 113 of the main body 112 while the main body 112 is in its open state (e.g., as shown in FIG. 7). Further, each of the locking elements 136 is configured to be locked in place within a closed cavity of the main body 112 while the main body 112 is in its closed state (e.g., as shown in FIG. 1).

The brace element 132a can also be referred to as a first brace element 132a or an upper left brace element 132a; the brace element 132b can also be referred to as a second brace element 132b or a lower left brace element 132b; the brace element 132c can also be referred to as a third brace element 132c or an upper right brace element 132c; and the brace element 132d can also be referred to as a fourth brace element 132d or a lower right brace element 132d. Additional details of a brace element 132 are described below with reference to FIGS. 9A-9C. The corner element 134 and the locking element 136 of each brace element 132 can be integrally formed, or can be separately formed and attached to one another by welding and/or fasteners. Each corner element 134 can be integrally formed, e.g., by bending an appropriately stamped metal sheet, or can be formed of multiple pieces welded or otherwise attached to one another. Similarly, each locking element 136 can be integrally formed, or can be formed of multiple pieces welded or otherwise attached to one another, as can be appreciated from the drawings. Elements of the security apparatus 102 can alternatively or additionally be cast and/or machined, and/or made in a variety of different manners.

Figure 6:
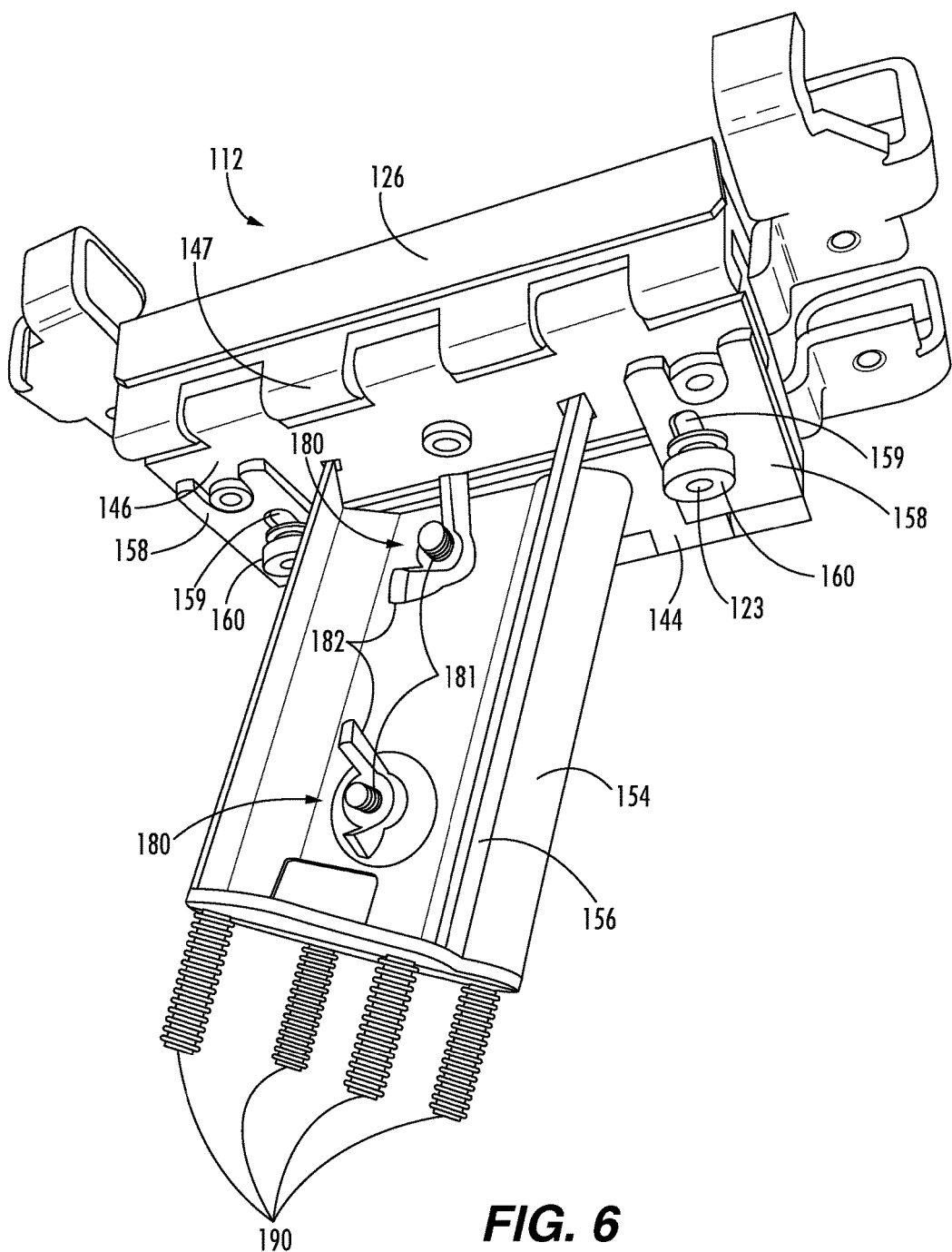
FIG. 6 is a rear perspective view of the adjustable size security apparatus introduced in FIG. 1 while its collar is removed, and its main body is in its closed state.

As shown, for example, in FIGS. 4 and 6-8, a first neck portion 154 extends from the first back portion 144, and a second neck portion 156 extends from the second back portion 146. As shown in FIG. 6, the first and second neck portions 154, 156 are adjacent to one another while the main body 112 is in its closed state. The first and second neck portions 154, 156 cannot be seen in many of the FIGS., such as FIGS. 1 and 3, because they are covered by a collar 162 that is configured to be slid over and encase peripheries of the first and second neck portions 154, 156 while the main body 112 is in its closed state. As can be seen in FIG. 6, the first and second neck portions 154, 156 are configured to be secured to one another using one or more fasteners 180 while the main body 112 is in the closed state. Such fasteners 180 can include, e.g., one or more bolts 181 and one or more nuts 182 (e.g., wingnuts, as shown in FIG. 6), but are not limited thereto. More specifically, when the main body 112 is placed in its close position, the bolts 181 that extend from the first neck portion 154 pass through through-holes 183 (e.g., shown in FIGS. 7 and 8) in the second neck portion 156, and then nuts 182 are rotativity secured over the bolts 181 to secure the first and second neck portions 154, 156 to one another.

In accordance with certain embodiments, the one or more fasteners 180, which are used to secure the first and second neck portions 154, 156 to one another, are covered by the collar 162 after the collar 162 has been slid over and encases the peripheries of the first and second neck portions 154, 156 while the main body 112 is in its closed state. This makes the fastener(s) inaccessible to a potential thief while the collar 162 encases the peripheries of the first and second neck portions 154, 156.

In accordance with certain embodiments, one or more bolts 190 or other types of fasteners extend from the distal end of each of the first and second neck portions 154, 156. As can be seen from the side view in FIG. 3, while collar 162 is encasing the peripheries of the first and second neck portions 154, 156, the bolts 190 extend downward from the neck 152 (and more specifically, from distal ends of the first and second neck portions 154, 156) thereby enabling the bolts 190 to be inserted into through-holes in a tabletop 206 of a display table. Nuts 192 (e.g., wingnuts) can then be used to secure the security apparatus 102 to the tabletop 206 from the underside of the tabletop 206. Preferably, the underside of the tabletop 206 is made inaccessible to customers and potential thieves in a retail store, e.g., by being encased in a locked enclosure. This way potential thieves cannot remove the security apparatus 102 from the display table, and thus, could not steal the portable electronic device that is secured to the display table by the security apparatus 102. Further, while the security apparatus 102 is secured to a display table, the collar 162 cannot be removed, and thus, a potential thief cannot access the fasteners (e.g., the bolts 181 and the nuts 182 shown in FIG. 6) that keep the first and second neck portions 154, 156 adjacent to one another and the main body 112 of the security apparatus 102 in its closed state. While the main body 112 of the security apparatus 102 is in its closed state, a portable electronic device (e.g., a mobile phone) secured within the security apparatus 102 cannot be removed by a potential thief.

Figure 2:
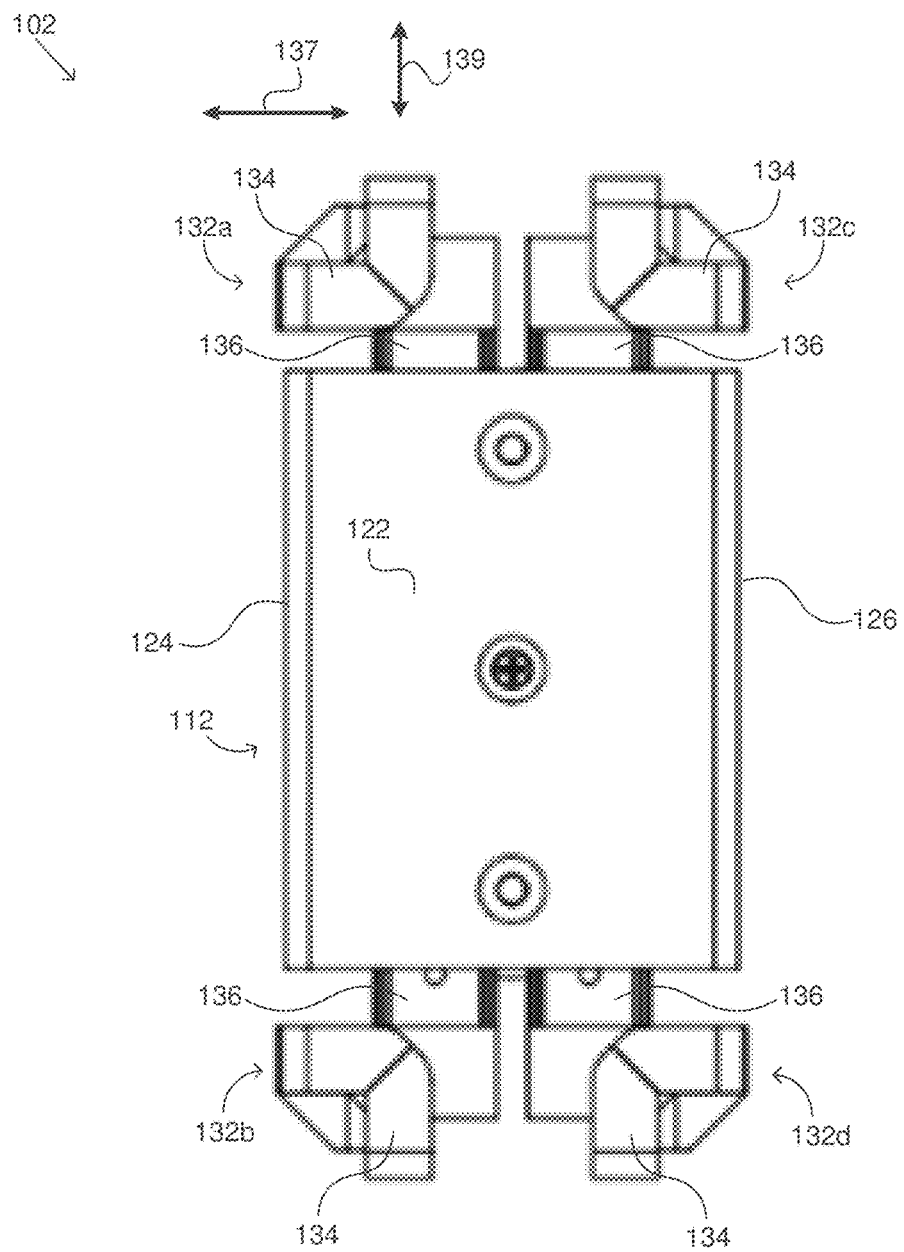
FIG. 2 is front view of the adjustable size security apparatus introduced in FIG. 1.
Figure 3:
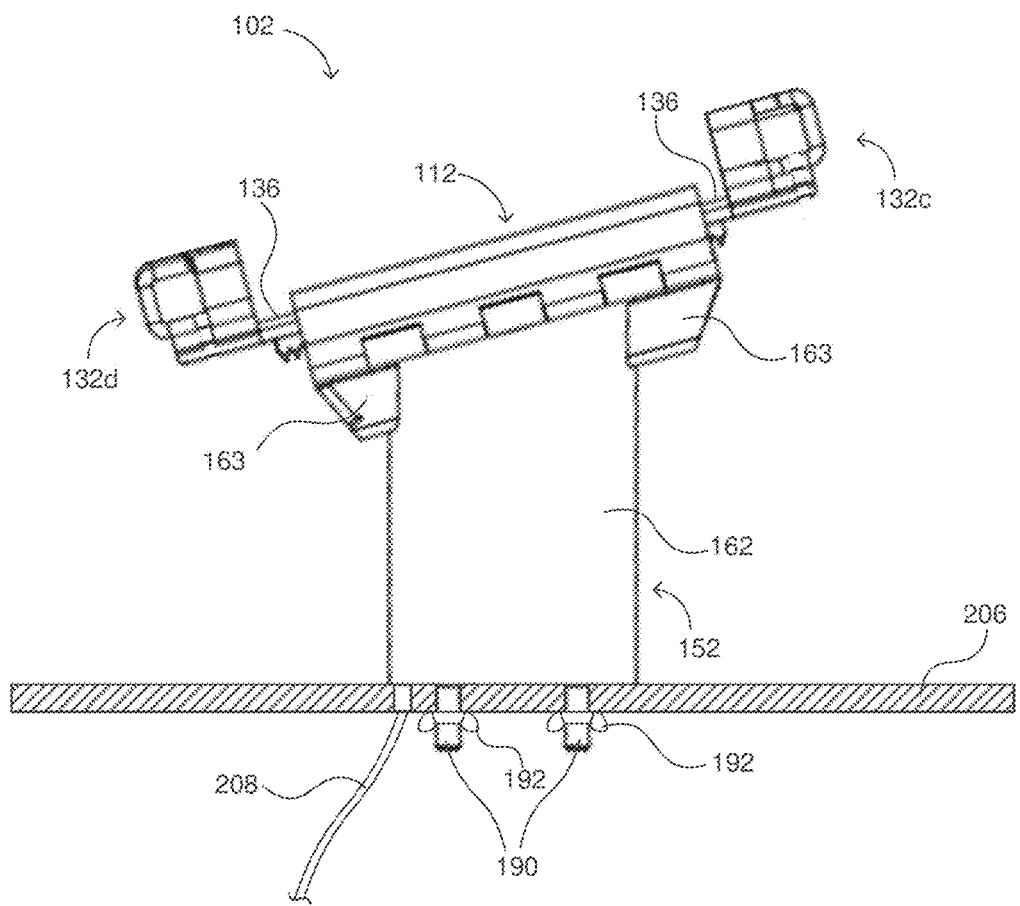
FIG. 3 is side view of the adjustable size security apparatus introduced in FIG. 1.
Figure 5:
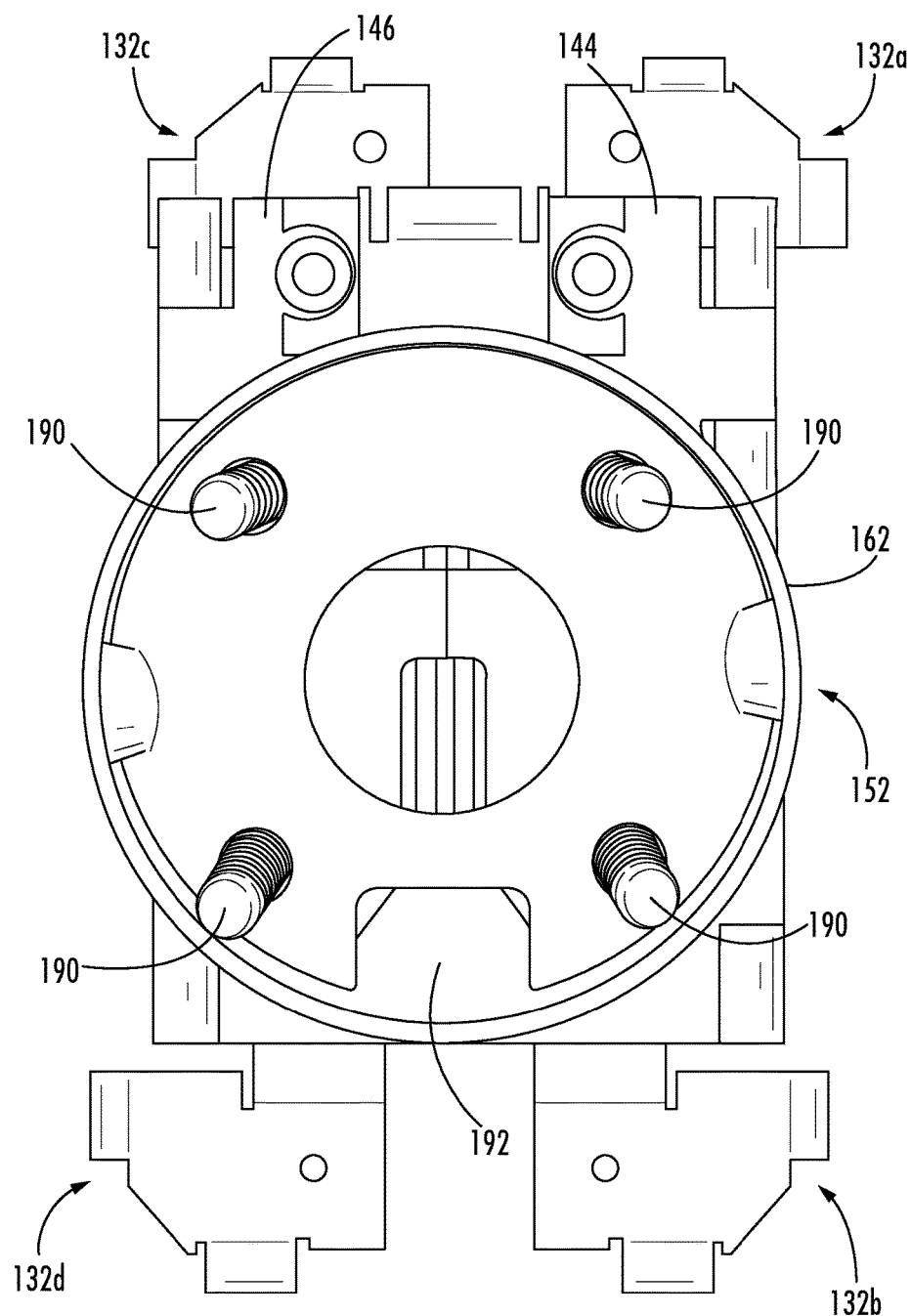
FIG. 5 is rear view of the adjustable size security apparatus introduced in FIG. 1.

Also shown in FIG. 3 is a portion of a power cord 208 that is threaded through the inside of the collar 162 and through another through-hole in the tabletop to allow a secured portable electronic device to be powered and/or charged by plugging the power cord into an electric socket (not shown) located under the tabletop 106. An opening 192 at a distal end of the neck 152, through which the power cord 208 can be threaded, is shown in FIG. 5, Referring again to FIG. 1, the main body 112 of the security apparatus 102 is shown in its closed state, during which state the four brace elements 132 are locked in place (in a manner that will be described in more detail below). In contrast, when the main body 112 is in its open state (e.g., as shown in FIG. 7), each of the four brace elements 132 can be maneuvered fore and aft (as represented by the double arrowed line 137 in FIGS. 1, 2 and 7), as well as left and right (as represented by the double arrowed line 139 in FIGS. 1, 2 and 7). This maneuverability of the brace element 132 when the main body 112 is in its open state enables the size of the security apparatus 102 to be adjusted to secure any one of various different size portable electronic devices (within a specified range of sizes) to the security apparatus 102, and thereby secured to a display table to which the security apparatus 102 is secured. It is noted that while the double arrowed lines 137 and 139 are shown in FIGS. 1 and 2, the brace elements 132 are not actually maneuverable when the main body 112 is in the closed state shown in FIGS. 1 and 2. Rather, the main body 112 should be in the open state, e.g., as shown in FIG. 7, in order to allow the brace element 132 to actually be maneuverable. Then, after the brace elements 132 have been maneuvered to cause the security apparatus 102 to be appropriately sized for a portable electronic device to be secured, the main body 112 should be transitioned from its open state to its closed state by pivoting the first and second back portions 144, 146 of the main body 112 relative to the front portion 122 using the first and second hinges 145, 147.

Figure 8:
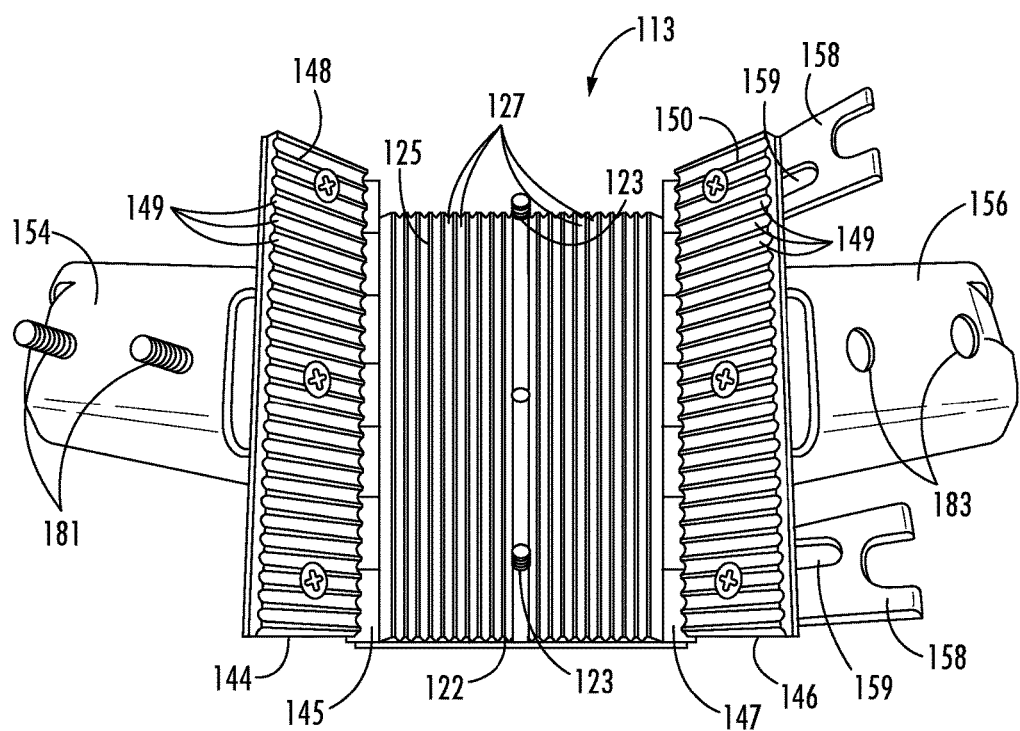
FIG. 8 is a rear perspective view of the adjustable size security apparatus introduced in FIG. 1 while its main body is in its open state and its brace elements are removed.
Figure 9A:
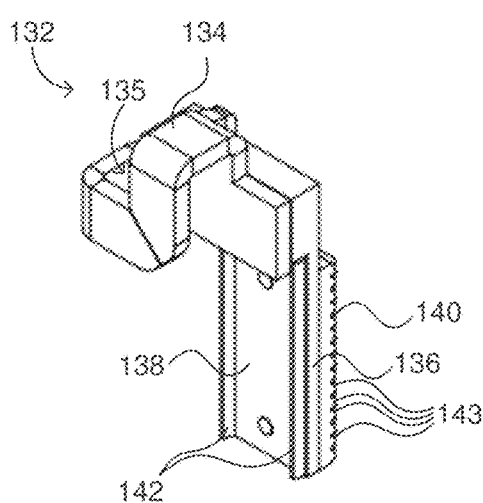
FIGS. 9A, 9B, 9C and 9D are, respectively, front perspective, side, front, and rear views of one of the brace elements according to an embodiment of the present technology.
Figure 9B:
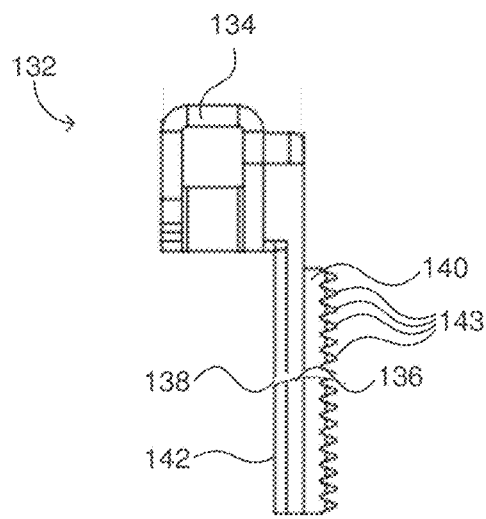
Figure 9C:
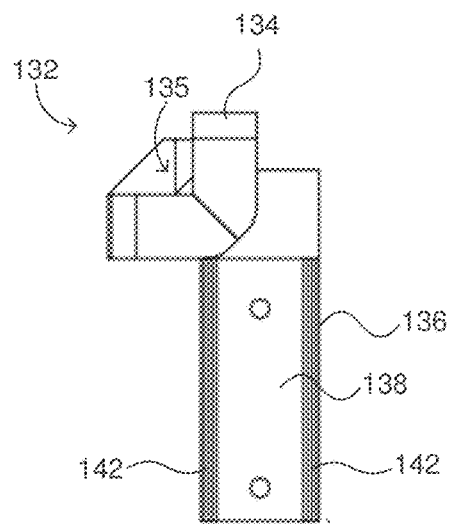
Figure 9D:
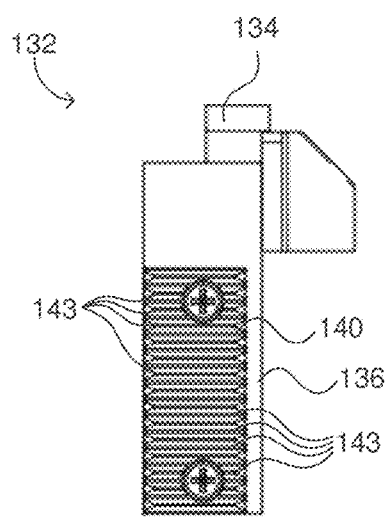
Figure 10A:
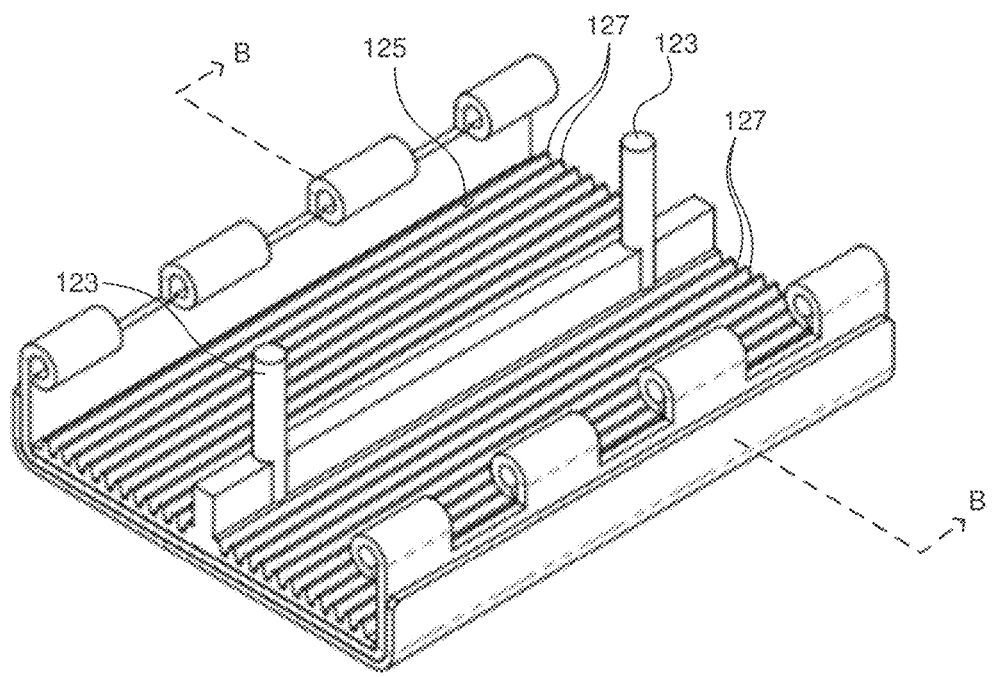
FIG. 10A is a rear perspective view of the front portion of the main body of the adjustable size security apparatus introduced in FIG. 1.
Figure 10B:
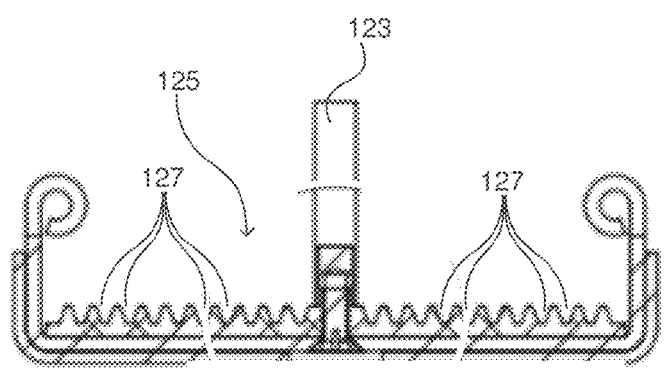
FIG. 10B is a cross-section view of the main body along lines B-B in FIG. 10A.

Reference is now made to FIG. 8, which shows the main body 112 in its open state, with the brace elements 132 removed so that a backside 125 of the main body 112 can be seen. In the embodiment shown, the backside 125 of the main body 112 includes a plurality of parallel grooves 127 extending in a longitudinal direction. This can also be seen in FIGS. 10A and 10B. Explained another way, as can be seen in FIGS. 10A and 10B, the backside 125 of the main body 112 has a sawtooth profile.

Figure 11A:
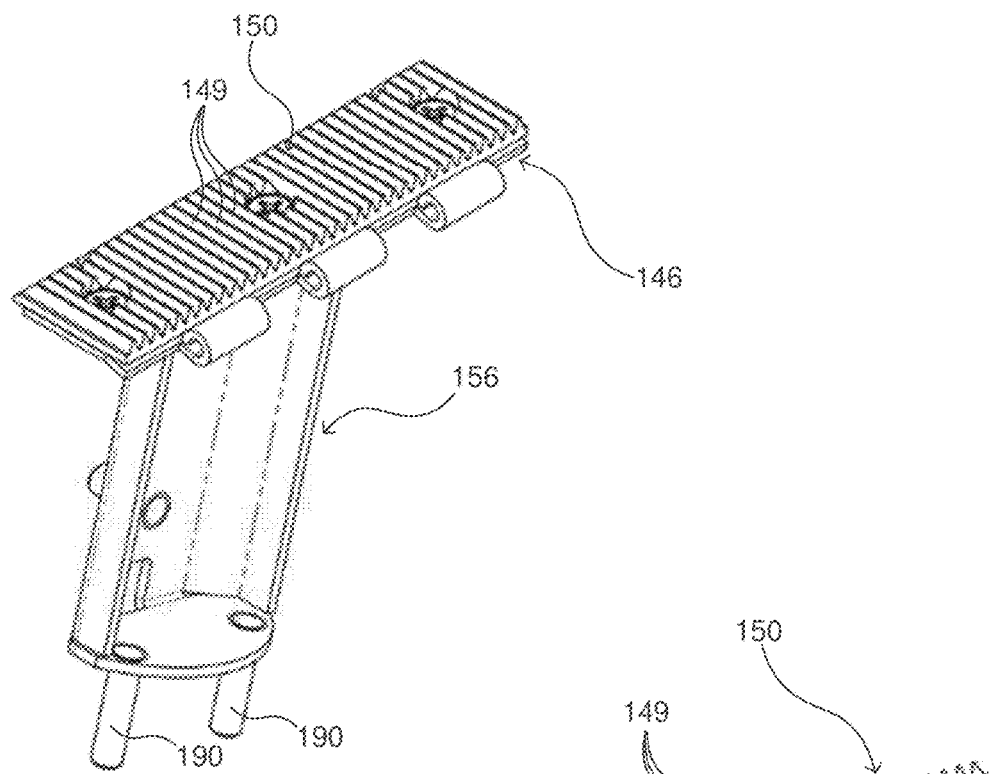
FIG. 11A is a front perspective view of one of the two back portions of the main body and one of the two neck portions extending therefrom.
Figure 11B:
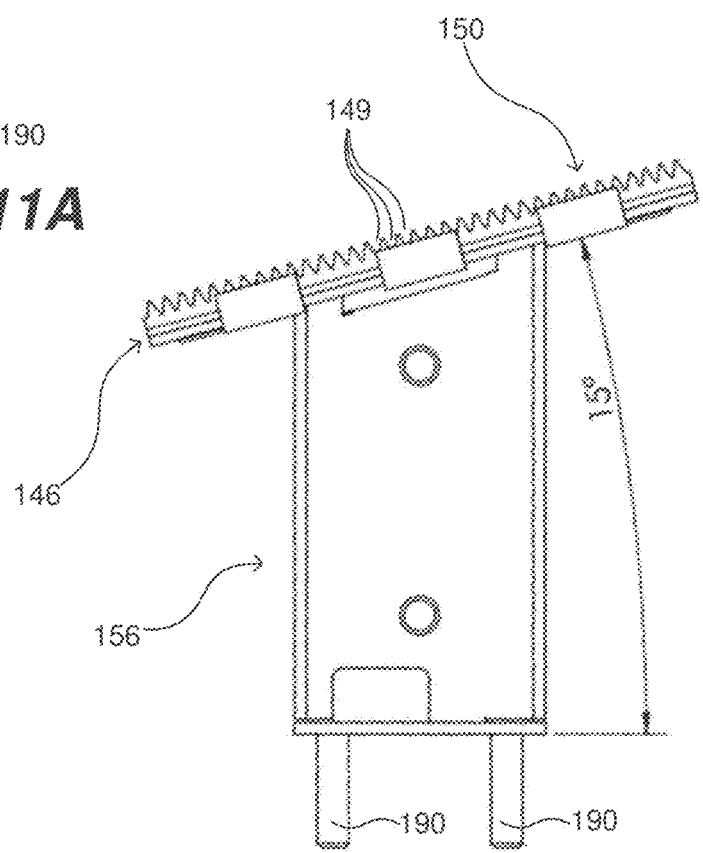
FIG. 11B is a side view of the back portion and neck portion shown in FIG. 11A.

Referring to FIG. 8 again, also shown therein is the frontside 148 of the back portion 146 of the main body 112, and the frontside 150 of the back portion 146 of the main body 112. In the embodiment shown, the frontsides 148, 150 of the back portions 144, 156 each include a plurality of parallel grooves 149 extending in a lateral direction, which is orthogonal to the grooves 127 on the backside 125 of the main body 112 that extend in the longitudinal direction. This can also be seen in FIGS. 11A and 11B. Explained another way, as can be seen in FIGS. 11A and 11B, the frontside 150 of the back portion 146 has a sawtooth profile. In the embodiment shown, the sawtooth profile of the frontside 150 of the back portion 146 (and also the sawtooth profile of the frontside 148 of the back portion 144) is orthogonal to the sawtooth profile of the backside 125 of the front portion 122 of the main body 112.

Reference is now made to FIG. 11A, which is a front perspective view of the back portion 146 of the main body 112 and the neck portion 156 extending therefrom, and to FIG. 11B, which is a side view of the back portion 146 and the neck portion 156. In the embodiment shown, the frontside 150 of the back portion 146 of the main body 112 is shown as including a plurality of parallel grooves 149 extending in a lateral direction, which is orthogonal to the grooves 127 in the backside 125 of the main body 112 that extend in the longitudinal direction.

Reference is now made to FIGS. 9A, 9B, 9C and 9D, which are, respectively, front perspective, side, front, and rear views of one of the brace elements 132 according to an embodiment of the present technology. The brace element 132 is shown as including a corner element 134 that is configured to be placed over a corner of a rectangular shaped portable electronic device, such as a mobile phone. In the embodiment shown the corner element 134 provides a pocket into which a corner of a rectangular shaped portable electronic device can be inserted and held. In the embodiment shown, the corner element includes a corner opening 135 that enables a portion of a corner of the rectangular shaped portable electronic device to be seen, but that need not be the case. In other words, an alternative corner element of a brace element may not enable a portion of a corner of the rectangular shaped portable electronic device to be seen. The actual form factor of the corner element 134 can be changed in a variety of different manners while still achieving its function of holding at least a portion of a corner portion of rectangular shaped portable electronic device, to enable the portable electronic device to be secured to the security apparatus 102.

The locking element 136 of each brace element 132 includes a frontside 138 and a backside 140. As shown, e.g., in FIG. 9A, the frontside 138 of the locking element 136 of the brace element 132 shown therein includes a pair of parallel protuberances 142 extending longitudinally. These protuberances 142 are configured to fit within a pair of the parallel grooves 127 included on the backside 125 of the front portion 122 of the main body 112. As shown, e.g., in FIGS. 9B and 9D, the backside 140 of the locking element 136 of the brace element 132 shown therein includes a plurality of parallel protuberances 143 extending laterally. These protuberances 143 are configured to fit within a pair of the parallel grooves 149 included on the frontside 148 or 150 of one of the back portions 144 or 146 of the main body 112.

The locking element 136, of each of the four brace elements 132, is maneuverable in the longitudinal direction by moving the protuberances 142 relative to the parallel grooves 127 included on the backside 125 of the front portion 122 of the main body 112. Additionally, the locking element 136, of each of the four brace elements 132, is maneuverable laterally by moving the protuberances 143 relative to the parallel grooves 149 included on the frontside 148 or 150 of one of the back portions 144 or 146 of the main body 112.

Once the corner element 134 of each of the brace elements 132 is placed over a portion of a corner of a rectangular shaped portable electronic device and the locking element 136 of each of the brace elements 132 is maneuvered into its correct position within the open cavity 113 of the main body 112 while the main body 112 is in its open state, the main body 112 can then be transitioned from its open state to its closed state by pivoting the first and second back portions 144 and 146 of the main body 112 using the first and second hinges 145 and 147. In the embodiment shown, the first back portion 144 should be pivoted first, and then the second back portion 146 should be pivoted. Once the main body 112 is in its closed state, the locking element 136, of each of the four brace elements 132, is locked in place by at least two of the parallel grooves 127 extending longitudinally and included on the backside 125 of the front portion 122 of the main body 112, and by at least two of the parallel grooves 149 extending laterally and included on the frontside 148 or 150 of one of the first or second back portions 144 or 146 of the main body 112.

Referring to FIG. 7, the back portion 146 of the main body 112 is shown as having a pair of bridge plates 158 extending therefrom, with each of the bridge plates 158 including a respective through-hole 159. After the back portion 146 is pivoted so that the main body 112 is in its closed state, bolts 123 (that extend from a middle the backside 125 of the front portion 122 of the main body) will pass through the through-holes 159 in the bridge plates 158, and then nuts 160 (shown in FIG. 6) can be rotativity secured over the bolts 123 to help secure the main body 112 in its closed state. After the collar 162 is slid over the first and second neck portions 154, 156, compartments 163 that extend from the collar 162 (e.g., as shown in FIG. 3) encase the bolts 123 and the nuts 160 so that they are not accessible to a potential thief. Additionally, after the collar 162 is slid over the first and second neck portions 154, 156, the bolts 181 and the nuts 182 that secure the neck portions to one another are also not accessible to a potential thief, as already noted above. Further, as noted above, after the collar 162 is slid over the first and second neck portions 154, 156, and the bolts 190 that extend from distal ends of the neck portions are attached to a tabletop of a display table, using nuts 192 (e.g., as shown in FIG. 3), and the security apparatus 102 (and the portable electronic device secured therein) cannot be removed from the display table by a potential thief so long as the underside of the tabletop is made inaccessible, e.g., by being encased in a locked enclosure.

Alternative features, besides grooves and perturbances can be used to hold the locking elements 136 of the brace elements 132 in place between the backside 125 of the front portion 122 of the main body 112 and the frontsides 148, 150 of the back portions 144, 146 of the main body 112. For example, a checkboard or other pattern of indents and detents, and the mirror image thereof, can be used to hold the locking elements 136 in place. For another example, instead of profiles of the features being sawtooth, the features can have a square wave of other profile. It would also be possible to change the orientations of the various features. These are just a few examples of alternative features that can be used lock the brace elements in place, which examples are not intended to be all encompassing. More generally, the backside 125 of the front portion 122 of the main body 112 can includes a plurality of first features, and the frontsides 138 of each of the first and second back portions 144, 146 can includes a plurality of second features. Further, the frontside 138 of each of the locking elements 136 (of each of the braces 132) can include third features configured to engage with one or more of the first features that are included on the backside 125 of the front portion 122 of the main body 112, and the backside 140 of each of the locking elements 136 (of each of the brace elements 132) can include fourth features configured to engage with one or more of the second features included on the frontsides of the first and second back portions 144, 146 of the main body 112.

Figure 12:
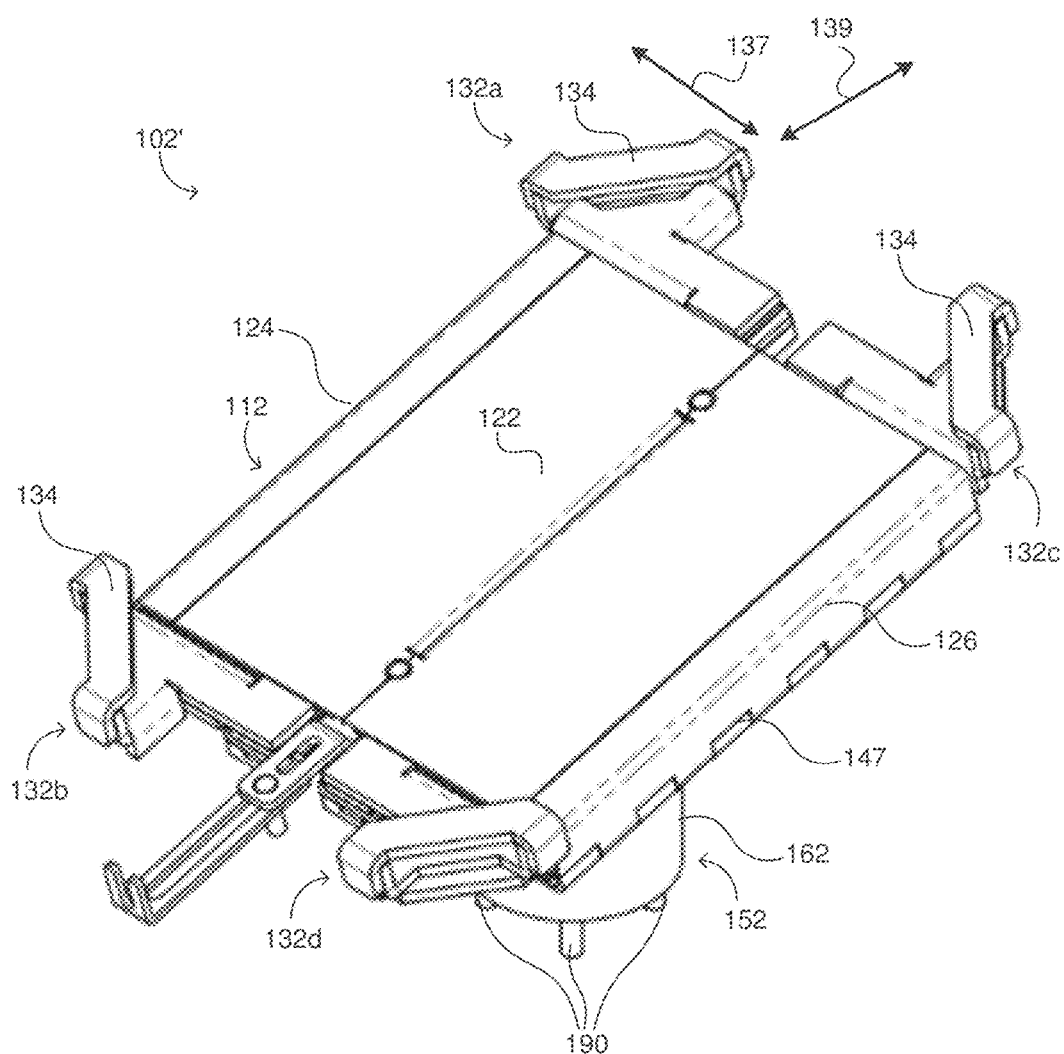
FIG. 12 is a front perspective view of an adjustable size security apparatus according to another embodiment of the present technology.
Figure 13:
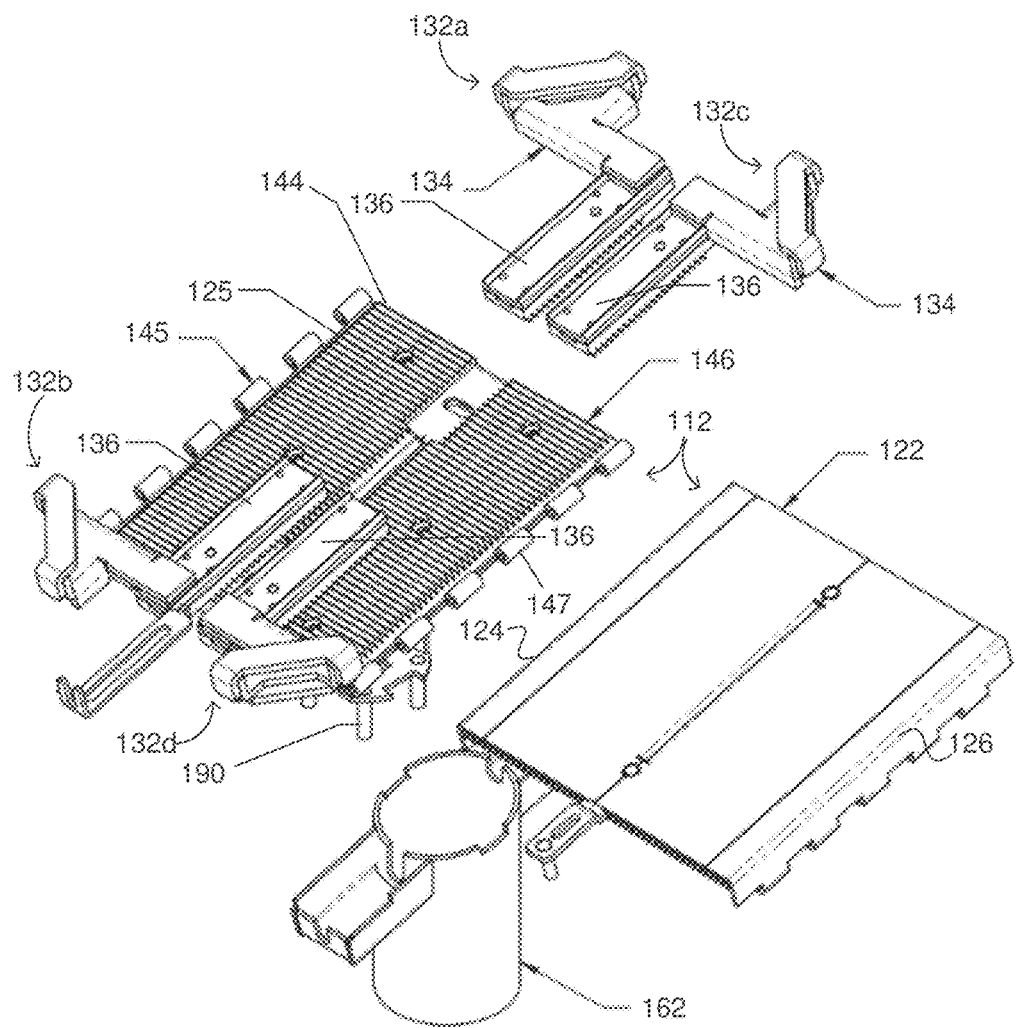
FIG. 13 is an exploded front perspective view of the adjustable size security apparatus introduced in FIG. 12.

FIG. 12 is a front perspective view of an adjustable size security apparatus 102' according to another embodiment of the present technology, and FIG. 13 is an exploded front perspective view of the adjustable size security apparatus 102' introduced in FIG. 12. The security apparatus 102' functions in the same manner as the security apparatus 102 described above with reference to FIGS. 1-11B, and thus, the same or substantially similar elements are labeled the same in FIGS. 12 and 13 as they were in FIGS. 1-11B and function in the same manners. The difference between the security apparatus 102' and the security apparatus 102 is primarily the form factor. Not every element is shown and/or labeled in FIGS. 12 and 13, but it should be appreciated that the security apparatus 102' includes the same types of elements as the security apparatus 102, even if they cannot be seen in FIGS. 12 and 13. For example, the security apparatus 102' also includes first and second neck portions 154 and 156, even they cannot be seen in the perspectives shown in FIGS. 12 and 13.

In accordance with certain embodiments of the present technology, the main body (e.g., 112) of the adjustable size security apparatus (e.g., 102 or 102') is configured to be transitioned between its closed state and its open state, and vice versa, using only a person's fingers. Additionally, in such embodiments, brace elements (including corner elements and locking elements) are also maneuverable using only a person's fingers to thereby adjust the size of the adjustable size security apparatus (e.g., 102 or 102') so that it is appropriately sized to secure any one of a plurality of different sized rectangular shaped portable electronic devices to a display table. Further, in certain embodiments, the adjustable size security apparatus (e.g., 102 or 102') is configured to be attached to a tabletop of a display table using only a person's fingers. Accordingly, in such embodiments the adjustable size security apparatus can be utilized and adjusted in size without the need for any special handheld tools, and even more specifically, without the need for any handheld or other tools at all. Such embodiments can in part be achieved by having the brace elements be maneuverable, using a person's fingers, when the main body is in its open position. Additionally, back portions of the main body are pivotable relative to the front portion of the main body using only a person's fingers. Further, any and all nuts (e.g., 182, 192, 160) that are rotatably fastenable to respective bolts (e.g., 181, 190, 123) are configured to be rotatable using only a person's fingers, e.g., by implementing the nuts using wingnuts (e.g., 182 or 192), using nuts having an outer circumferential surface that is textured (e.g., 160) for easy rotation using a person's fingers, and/or using any other hand rotatable type of nuts. Benefits of the adjustable size security apparatus being capable of being utilized and adjusted in size without the need for any handheld tools are that costs associated with such tools are eliminated, and there is no concern of needing to store tools or of losing and needing to replace such tools. Further, the adjustable size security apparatuses disclosed herein are very intuitive to use and adjust, and thus, require minimal instructions on how to use and adjust.

A security apparatus (e.g., 102 or 102') of an embodiment of the present technology can be adjusted to securely hold any one of a plurality of different sized portable electronic devices that are within some specified range. For example, the security apparatus 102 or 102' can be adjusted to securely hold standard sized mobile phones as well as plus sized mobile phones (which are also known as phablets) offered by a specific company. Further, the security apparatus 102 or 102' can be adjusted to security hold mobile phones offered by various different companies, such as Apple™, Samsung™, LG™, HTC™, Huawei™, Oppo™, Vivo™, Xiaomi™, ZTE™, and Lenovo™, just to name a few. Nevertheless, it still may be useful to have more than one model of the adjustable size security apparatuses, e.g., one for a range of different size mobile phones, and a slightly larger one for a range of different sized tablet computers, for example.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An adjustable size security apparatus adapted to selectively secure any one of a plurality of different sized rectangular shaped portable electronic devices to a display table, the apparatus comprising:

a main body including a front portion having a first side and a second side opposite the first side, a first back portion attached to the first side of the front portion by a first hinge, and a second back portion attached to the second side of the front portion by a second hinge;

the main body having a closed state and an opened state that are transitional between by pivoting the first and second back portions of the main body relative to the front portion using the first and second hinges, the main body providing an open cavity while the main body is in its open state, and the main body providing a closed cavity between the front portion and the first and second back portions thereof while the main body is in its closed state; and four brace elements each including a respective corner element and a respective locking element coupled to the corner element, each of the corner elements configured to be placed over a respective one of four corners of a rectangular shaped portable electronic device, each of the locking elements configured to be maneuverable within the open cavity of the main body while the main body is in its open state, and each of the locking elements configured to be locked in place within the closed cavity of the main body while the main body is in its closed state.

2. The apparatus of claim 1, further comprising:

a first neck portion that extends from the first back portion of the main body; and a second neck portion that extends from the second back portion of the main body;
wherein the first and second neck portions are adjacent to one another while the main body is in its closed state; and
wherein the first and second neck portions are separated from one another while the main body is in its open state.

3. The apparatus of claim 2, further comprising a collar that is configured to be slid over and encase peripheries of the first and second neck portions while the main body is in its closed state.

4. The apparatus of claim 3, wherein:
the first and second neck portions are configured to be secured to one another, using one or more fasteners, while the main body is in the closed state; and
the one or more fasteners, which are used to secure the first and second neck portions to one another, are covered by the collar after the collar has been slid over and encases the peripheries of the first and second neck portions while the main body is in its closed state, and thus, the one or more fasteners are inaccessible while the collar is encasing the peripheries of the first and second neck portions.

5. The apparatus of claim 1, wherein:
a backside of the front portion of the main body includes a plurality of first features;
a frontside of each of the first and second back portions includes a plurality of second features;
the locking element, of each of the four brace elements, includes
a frontside having a plurality of third features configured to engage with at least some of the first features that are on the backside of the front portion of the main body, and
a backside having a plurality of fourth features configured to engage with at least some of the second features that are on the frontside of one of the first and second back portions of the main body.

6. The apparatus of claim 5, wherein while the main body is in its open state:
the locking element, of each of the four brace elements, is maneuverable in a first direction by moving the third features on the frontside of the locking element relative to the first features on the backside of the front portion of the main body; and
the locking element, of each of the four brace elements, is maneuverable in a second direction, that is orthogonal to the first direction, by moving the fourth features on the backside of the locking element relative to the second features on the frontside of one of the first and second back portions of the main body.

7. The apparatus of claim 6, wherein each locking element, of the four brace element elements, is configured to be locked in place while the main body is in its closed state by:
engagement between one or more of the first features on the backside of the front portion of the main body and one or more third features on the frontside of the locking element; and
engagement between one or more of the second features on the frontside of one of the first and second back portions of the main body and one or more fourth features on the backside of the locking element.

8. The apparatus of claim 7, wherein:
the first features, that are on the backside of the front portion of the main body, comprises a plurality of parallel grooves extending in a first direction;
the second features, that are on the frontside of each of the first and second back portions of the main body, comprise a plurality of parallel grooves extending in a second direction that is orthogonal to the first direction;
the third features, that are on the frontside of the locking element of each of the four brace elements, comprises a plurality of parallel protuberances extending in the first direction and configured to fit within at least some of the parallel grooves extending in the first direction that are on the backside of the front portion of the main body; and
the fourth features, that are on the backside of the locking element of each of the four brace elements, comprises a plurality of parallel protuberances extending in the second direction and configured to fit within at least some of the parallel grooves extending in the second direction that are on the frontside of one of the first and second back portions of the main body.

9. The apparatus of claim 8, wherein while the main body is in its open state:
the locking element, of each of the four brace elements, is maneuverable in the first direction by moving the protuberances extending in the first direction relative to the parallel grooves extending in the first direction that are on the backside of the front portion of the main body; and
the locking element, of each of the four brace elements, is maneuverable in the second direction by moving the protuberances extending in the second direction relative to the parallel grooves extending in the second direction that are on the frontside of one of the first and second back portions of the main body.

10. The apparatus of claim 9, wherein each locking element, of the four brace elements, is configured to be locked in place while the main body is in its closed state by:
engagement between one or more of the parallel grooves extending in the first direction on the backside of the front portion of the main body and one or more protuberances on the frontside of locking element; and
engagement between one or more of the parallel grooves extending in the second direction on the frontside of one of the first and second back portions of the main body and one or more protuberances extending in the second direction on the backside of the locking element.

11. An adjustable size security apparatus adapted to selectively secure any one of a plurality of different sized rectangular shaped portable electronic devices to a display table, the apparatus comprising:
a main body having a closed state and an opened state that are transitional between;
four brace elements each including a respective corner element and a respective locking element coupled to the corner element;
a first neck portion that extends from a first portion of the main body; and
a second neck portion that extends from a second back portion of the main body;
each of the corner elements configured to be placed over a respective one of four corners of a rectangular shaped portable electronic device; and
each of the locking elements configured to be maneuverable while the main body is in its open state, and each of the locking elements configured to be locked in place while the main body is in its closed state;

wherein the first and second neck portions are adjacent to one another while the main body is in its closed state; and wherein the first and second neck portions are separated from one another while the main body is in its open state.

12. The apparatus of claim 11, wherein the first and second neck portions are configured to be secured to one another, using one or more fasteners, while the main body is in the closed state.

13. The apparatus of claim 12, further comprising:
a collar that is configured to be slid over and encase peripheries of the first and second neck portions while the main body is in its closed state;
wherein the one or more fasteners, which are used to secure the first and second neck portions to one another, are covered by the collar after the collar has been slid over and encases the peripheries of the first and second neck portions while the main body is in its closed state, and thus, the one or more fasteners are inaccessible while the collar is encasing the peripheries of the first and second neck portions.

14. The apparatus of claim 11, wherein while the main body is in its open state the locking element, of each of the four brace elements, is maneuverable in a first direction and a second direction that is orthogonal to the first direction.

15. An adjustable size security apparatus adapted to selectively secure any one of a plurality of different sized rectangular shaped portable electronic devices to a display table, the apparatus comprising:
a main body having a closed state and an opened state that are transitional between; and
four brace elements each including a respective corner element and a respective locking element coupled to the corner element;
each of the corner elements configured to be placed over a respective one of four corners of a rectangular shaped portable electronic device; and
each of the locking elements configured to be maneuverable while the main body is in its open state, and each of the locking elements configured to be locked in place while the main body is in its closed state;
wherein each locking element, of the four brace elements, is configured to be locked in place while the main body is in its closed state by:
engagement between one or more first features of a first portion of the main body and one or more third features of the locking element that are parallel to the first features; and
engagement between one or more of the second features of a second portion of the main body and one or more fourth features of the locking element that are parallel to the second features, the second and fourth features being orthogonally oriented relative to the first and third features.

16. The apparatus of claim 15, wherein:
the first features of the first portion of the main body have a first sawtooth or square wave profile; and
the second features of the second portion of the main body have a second sawtooth or square wave profile that is orthogonally oriented relative to the first sawtooth or square wave profile.

17. An adjustable size security apparatus comprising:
a plurality of brace elements each of which is configured to be secured to a separate portion of any one of a plurality of different sized rectangular shaped portable electronic devices;
a main body configured to selectively lock the brace elements in place so that the brace elements cannot be removed from the any one of a plurality of different sized rectangular shaped portable electronic devices to which the brace elements are secured; and
a neck configured to secure the main body to a display table and thereby secure, to the display table, the any one of a plurality of different sized rectangular shaped portable electronic devices to which the brace elements are secured;
the main body including a front portion and first and second back portions that are attached to the first portion, respectively, by first and second hinges;
the main body having a closed state and an opened state that are transitional between by pivoting the first and second back portions of the main body relative to the front portion of the main body using the first and second hinges; and
each of the brace elements including a respective locking element configured to be maneuverable while the main body is in its open state, and configured to be locked in place while the main body is in its closed state.

18. The apparatus of claim 17, wherein the plurality of brace elements comprises four brace elements each of which includes a portion that is configured to be secured to a respective one of four corners of the any one of a plurality of different sized rectangular shaped portable electronic devices.

19. The apparatus of claim 18, wherein:
the neck includes a first neck portion that extends from the first back portion of the main body and a second neck portion that extends from the second back portion of the main body;
the first and second neck portions are separated from one another while the main body is in its open state; and
when the first and second neck portions are secured to one another the main body is in its closed position and locks the brace elements in place.

20. The apparatus of claim 18, wherein the any one of a plurality of different sized rectangular shaped portable electronic devices that the apparatus can be used to secure to a display table is selected from a group consisting of:
a mobile phone;
an e-reader;
a personal data assistant; and
a tablet computer.

* * * * *